United States Patent [19]

Wilder

[11] 3,933,739
[45] Jan. 20, 1976

[54] N-ISOPROPYL-N'-5-METHYL-3-HEPTYL-P-PHENYLENEDIAMINE ANTIOZONANT FOR RUBBER

[75] Inventor: Gene Ray Wilder, Medina, Ohio

[73] Assignee: Monsanto Company, St. Louis, Mo.

[22] Filed: Oct. 10, 1974

[21] Appl. No.: 513,713

[52] U.S. Cl............ 260/45.9 QB; 260/814; 260/577
[51] Int. Cl.$^2$............................................ C08G 6/00
[58] Field of Search ..................... 260/45.9 QB, 814

[56] References Cited
UNITED STATES PATENTS

| 3,419,639 | 12/1968 | Gentile | 260/45.9 |
| 3,427,281 | 2/1969 | Young et al. | 260/45.9 |
| 3,565,856 | 2/1971 | Davies et al. | 260/45.9 |

*Primary Examiner*—V. P. Hoke

[57] ABSTRACT

N-Isopropyl-N'-5-methyl-3-heptyl-p-phenylenediamine useful as an antiozonent for the preservation of diene rubber.

3 Claims, No Drawings

N-ISOPROPYL-N'-5-METHYL-3-HEPTYL-P-PHENYLENEDIAMINE ANTIOZONANT FOR RUBBER

This invention relates to the unsymmetrical dialkyl-p-phenylenediamine, N-isopropyl-N'-5-methyl-3-heptyl-p-phenylenediamine and to diene elastomers preserved therewith.

BACKGROUND OF THE INVENTION

Di(sec-alkyl)-p-phenylenediamines are powerful antioxidants and antiozonants for the preservation of diene rubber. Higher members of 7 or 8 carbon alkyl groups having high antioxidant and antiozonant properties, acceptable low volatility and low skin burning effect are produced from ketones of 7 or 8 carbon atoms and have become widely accepted in the rubber industry. The high antidegradant activity, availability and economy of the raw materials recommend lower alkyl groups. However, the lower members of the series are volatile skin irritants with the result that not only are they rapidly lost from the rubber with resultant loss of preservative action but cause serious discomfort to workmen. Moreover, rubber preserved with the 6 carbon atom alkyl compound, N,N'-di(1,4-dimethylbutyl)-p-phenylenediamine, gives evidence of being a skin sensitizer. The ability of an agent to elicit a primary skin irritation is wholly different from that of producing skin sensitization.

SUMMARY OF THE INVENTION

In accordance with this invention, it has been found that N-isopropyl-N'-5-methyl-3-heptyl-p-phenylenediamine, obtainable from readily available raw materials, is a valuable antidegradant which presents little or no hazard to workmen coming in contact with rubber containing it.

DESCRIPTION OF PREFERRED EMBODIMENTS

To a hydrogenator is charged in 90 parts by weight (0.5 molecular proportion) of N-isopropyl-p-nitroaniline, 250 parts by weight (1.9 molecular proportions) of 5-methyl-3-heptanone, 6 parts by weight of acidic carbon co-catalyst (Summers U.S. Pat. No. 3,414,616) and 10 parts by weight of 1% platinum on carbon catalyst. The charge is subjected to hydrogen for 30 minutes at 14.06-21.09 kg/sq cm hydrogen pressure at a temperature of 25°-100°C. Hydrogen pressure is then raised to 28.1 kg/sq cm and temperature to 120°C and the reaction continued for 3 hours. The reaction mixture is cooled to 50°C, removed from the hydrogenator, filtered, and volatile constituents removed by heating in vacuo to 185°C at 3-4 mm mercury pressure. The residue is 23 parts by weight of N-isopropyl-N'-5-methyl-3-heptyl-p-phenylenediamine, a dark viscous liquid.

Rubber ozone resistance is illustrated by a method published by Decker and Wise, The Stress Relaxation Method for Measuring Ozone Cracking, *Rubber World*, April 1962, page 66. The equipment comprises an oven serving as an ozone cabinet filled with ozone generating equipment and racks for both static and dynamic testing. Static racks handle stocks at strains of 5, 10, 20, 30 and 40%. The dynamic rack is a reciprocal mechanism which imparts a 25% strain to the rubber test piece on movement of a top plate which moves vertically with respect to a stationary bottom plate. The mechanism is driven at a rate of 90 cycles per minute by a gear mounted on the outside of the cabinet. The test pieces are 2-inch long T-50 (ASTM D599-55) specimens died from standard stress strain test sheets (ASTM D15-57T). They are mounted by placing the ends in radial slots milled into the edges of circular plates of the racks. The tab ends fit into circumferential grooves machined into the outer surfaces of the plates.

The stress relaxation method is based on the principle that the effective cross-sectional area of a small test piece of rubber is reduced by ozone cracking. The extent of cracking in a test piece is determined by measuring the forces required to extend the test piece 100% before and after exposure to ozone. The ozone concentration for the test is 25 parts ozone/100 million parts air. As the strip begins to crack, the number of stress supporting rubber chains decreases and the force required to extend the strip 100% is reduced. The ratio of this force to the original force is calculated at approximately 16-hour intervals of exposure to ozone. The graph of force vs. time is essentially a straight line and the time required for obtaining a predetermined percent of the original force is determined from the graph. The ability of the rubber to resist ozone attack is evaluated by comparison of these times to times for a suitable control to reach a corresponding percent of its original force. The percents of original moduli of the rubber test pieces are listed as percent retention in the Table infra and the times to reach 80% retentions are recorded. Longer times indicate better ozone resistance of the rubber stock. The intermittent test comprises 2-hour cycles during which the specimens are exposed dynamically 15% of the time and during the remainder of the time are exposed statically at 25% strain.

The test stock comprises a styrene-butadiene copolymer rubber formulation (SBR). It comprises the following, all parts being by weight:

| | |
|---|---|
| Oil extended SBR | 137.5 |
| Furnace carbon black (ISAF) | 65 |
| Zinc oxide | 3 |
| Stearic acid | 1 |
| Aromatic type oil | 1.5 |
| Sulfur | 2 |
| tert-butyl-2-benzothiazole-sulfenamide | 1.2 |
| Antidegradant (where present) | 2.0 |

Stock 1 is a control stock containing no antidegradant. Stock 2 contains as antidegradant N,N'-di(5-methyl-3-heptyl)-p-phenylenediamine and Stock 3 contains as the antidegradant N-isopropyl-N'-5-methyl-3-heptyl-p-phenylenediamine. The stocks are cured in a press and determinations are made on the cured unaged samples and on cured samples aged in an oven for 24 hours at 100°C.

TABLE I

| | Stock | | |
|---|---|---|---|
| | 1 | 2 | 3 |
| Unaged dynamic ozone resistance: | | | |
| 80% retention, hours | 17 | 59 | 57 |
| Unaged static ozone resistance: | | | |
| 80% retention, hours | 14 | 69 | 192 |
| Unaged intermittent ozone resistance: | | | |
| 80% retention, hours | 6 | 48 | 64 |
| Aged dynamic ozone resistance: | | | |
| 80% retention hours | 22 | 32 | 27 |
| Aged static ozone resistance: | | | |
| 80% retention, hours | 18 | 26 | 23 |
| Aged intermittent ozone resistance: | | | |

TABLE I-continued

|  | Stock | | |
|---|---|---|---|
|  | 1 | 2 | 3 |
| 80% retention, hours | 22 | 30 | 26 |

The improvement is unaged static ozone resistance of Stock 3 over Stock 2 is especially significant because the dialkyl-p-phenylenediamine antidegradants are used primarily for short term static protection. They migrate to the rubber surface more quickly than the N-alkyl-N'-aryl-p-phenylenediamine antidegradants and provide excellent early protection to the rubber. Commercial use is generally in conjunction with a wax. Thus, a typical formulation for the sidewall of pneumatic tires suitable for practicing the invention comprises, all parts being by weight:

| cis-4-Polybutadiene rubber | 30 |
| Oil extended SBR | 96 |
| General purpose furnace black | 50 |
| Zinc oxide | 3 |
| Stearic acid | 1 |
| Wax | 2-5 |
| Sulfur | 2.2 |
| N-tert-butyl-2-benzothiazole-sulfenamide | 1.2 |
| N,N'-dialkyl-p-phenylenediamine antidegradant | 2.0 |

Skin tests on typical rubber compositions of the invention show that they are comparable to control compositions preserved with p-phenylenediamine antiozonants known from long commercial experience to be safe to use. Illustrative of the properties of the new compositions of the invention is the safety to human skin observed from dermatitic tests on human volunteer subjects with rubber preserved with N-isopropyl-N'-5-methyl-3-heptyl-p-phenylenediamine according to a modified repeated insult patch test method designed to correlate with results conforming to commercial experience. Human subjects not previously exposed to the test materials are subjected to squares of the appropriate test material. After 24 hours the square is removed and sites examined for reaction. After a 24 hour rest period, the test materials are reapplied. After fifteen such applications, a two-week rest period is allowed after which final challenge application is made to the same sites. The test composition comprises, all parts being by weight:

| Natural rubber | 50 |
| cis-4-Polybutadiene rubber | 30 |
| Oil extended SBR (about 27% oil) | 27.5 |
| High abrasion furnace black | 45 |
| Processing oil | 5 |
| Zinc oxide | 5 |
| Stearic acid | 1 |
| Wax | 2 |
| Sulfur | 2 |
| N-cyclohexyl-2-benzothiazole-sulfenamide | 1 |
| Antidegradant (where present) | 3 |

Appropriate controls without antidegradant and with known p-phenylenediamine antidegradants of established safety are run at the same time. Results with N-isopropyl-N'-5-methyl-3-heptyl-p-phenylenediamine are comparable to the p-phenylenediamine controls.

In general, the antidegradants of this invention are valuable for the preservation of sulfur-vulcanizable diene rubbers. Those containing more than 50% diene hydrocarbon are preferred. The group of rubbers includes natural rubbers, styrene-butadiene copolymer rubber and the various stereospecific polymerized dienes, for example, cis-polybutadiene and cis-polyisoprene. The compositions are also useful in diene rubbers of low unsaturation such as butyl rubber and ethylene-propylene-diene terpolymer rubber (EPDM). The amount to use will vary depending upon the particular formulation and the purpose of the compounder but, in general, the amounts will fall within the range of 0.1 to 5% of the rubber content.

Stereospecific rubbers are normally obtained as cements and it is important to add antidegradant to the organic solvent composition immediately after polymerization has been completed because these rubbers deteriorate rapidly unless adequately protected immediately after polymerization. The new antidegradants are also suited for addition to latex, for example, to protect the rubber phase of SBR rubber.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. Vulcanizable diene rubber having incorporated therein a stabilizing amount of N-isopropyl-N'-5-methyl-3-heptyl-p-phenylenediamine.

2. Vulcanized diene rubber having incorporated therein a stabilizing amount of N-isopropyl-N'-5-methyl-3-heptyl-p-phenylenediamine.

3. The composition of claim 2 wherein the rubber is styrene butadiene copolymer rubber.

* * * * *